United States Patent
Hardy et al.

(10) Patent No.: US 10,664,187 B2
(45) Date of Patent: May 26, 2020

(54) REDUCING A RATE AT WHICH DATA IS MIRRORED FROM A PRIMARY SERVER TO A SECONDARY SERVER

(71) Applicant: INTERNATIONAL BUSINESS MACHINES CORPORATION, Armonk, NY (US)

(72) Inventors: Clint A. Hardy, Tucson, AZ (US); Matthew G. Borlick, Tucson, AZ (US); Adrian C. Gerhard, Rochester, MN (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/829,706

(22) Filed: Dec. 1, 2017

(65) Prior Publication Data
US 2019/0171363 A1 Jun. 6, 2019

(51) Int. Cl.
*G06F 3/06* (2006.01)
*G06F 11/14* (2006.01)

(52) U.S. Cl.
CPC .............. *G06F 3/065* (2013.01); *G06F 3/067* (2013.01); *G06F 3/0619* (2013.01); *G06F 3/0665* (2013.01); *G06F 3/0689* (2013.01); *G06F 11/14* (2013.01)

(58) Field of Classification Search
CPC .. G06F 3/065; G06F 11/2056; G06F 11/2071; G06F 11/2089; G06F 11/2092; G06F 11/1092
See application file for complete search history.

(56) References Cited

U.S. PATENT DOCUMENTS

| | | | |
|---|---|---|---|
| 5,680,539 A * | 10/1997 | Jones | G06F 11/1435 711/114 |
| 5,684,696 A | 11/1997 | Rao et al. | |
| 5,822,584 A | 10/1998 | Thompson et al. | |

(Continued)

FOREIGN PATENT DOCUMENTS

| | | | | |
|---|---|---|---|---|
| CN | 103345450 A | 10/2013 | | |
| WO | WO-2017034610 A1 * | 3/2017 | ........... | G06F 3/0617 |

OTHER PUBLICATIONS

English translation of CN103345450A filed Oct. 9, 2013, [online] [Nov. 22, 2017] https://patents.google.com/patent/CN103345450A/en?language=English.

(Continued)

*Primary Examiner* — Edward J Dudek, Jr.
*Assistant Examiner* — Andrew Russell
(74) *Attorney, Agent, or Firm* — David W. Victor; Konrad Raynes Davda & Victor LLP

(57) ABSTRACT

Provided are a computer program product, system, and method for reducing a rate at which data is mirrored from a primary server to a secondary server. A determination is made as to whether a processor utilization at a processor managing access to the secondary storage exceeds a utilization threshold. If so, a determination is made as to whether a specified operation at the processor is in progress. A message is sent to the primary server to cause the primary server to reduce a rate at which data is mirrored from the primary server to the secondary server in response to determining that the specified operation is in progress.

18 Claims, 5 Drawing Sheets

(56) References Cited

U.S. PATENT DOCUMENTS

| | | | | |
|---|---|---|---|---|
| 6,647,514 | B1* | 11/2003 | Umberger | G06F 11/1092 714/42 |
| 7,016,985 | B2 | 3/2006 | Johnson | |
| 7,062,768 | B2 | 6/2006 | Kubo et al. | |
| 7,139,931 | B2 | 11/2006 | Horn | |
| 7,529,836 | B1 | 5/2009 | Bolen | |
| 7,721,292 | B2 | 5/2010 | Frasier et al. | |
| 8,699,452 | B2 | 4/2014 | Sarkar | |
| 8,738,880 | B2 | 5/2014 | Grusy et al. | |
| 8,751,861 | B2 | 6/2014 | Nair et al. | |
| 8,874,868 | B2 | 10/2014 | Baptist et al. | |
| 2009/0210618 | A1* | 8/2009 | Bates | G06F 11/1084 711/114 |
| 2009/0313617 | A1 | 12/2009 | Hung | |
| 2013/0054891 | A1* | 2/2013 | Kawaguchi | G06F 11/1092 711/114 |
| 2013/0318297 | A1* | 11/2013 | Jibbe | G06F 3/061 711/114 |
| 2015/0301894 | A1 | 10/2015 | Dennett et al. | |
| 2018/0113640 | A1* | 4/2018 | Fernandez | G06F 3/0634 |
| 2019/0171451 | A1 | 6/2019 | Hardy et al. | |
| 2019/0171509 | A1 | 6/2019 | Hardy et al. | |
| 2019/0332457 | A1 | 10/2019 | Hardy et al. | |
| 2019/0391889 | A1* | 12/2019 | Luo | G06F 11/2094 |

OTHER PUBLICATIONS

U.S. Appl. No. 15/829,715, filed Dec. 1, 2017.
U.S. Appl. No. 15/829,701, filed Dec. 1, 2017.
List of IBM Patents or Patent Applications Treated as Related, dated Dec. 1, 2017, pp. 2.
J. Lala, et al., "Architectural Principles for Safety-Critical Real-Time Applications", Proceeding of the IEEE, vol. 82, No. 1, Jan. 1994, pp. 16.
Response dated May 3, 2019, pp. 15, to Office Action dated Mar. 14, 2019, pp. 28, for U.S. Appl. No. 15/829,715.
Notice of Allowance, dated May 1, 2019, for U.S. Appl. No. 15/829,701, filed Dec. 1, 2017, Total 24 pages.
Office Action dated Mar. 14, 2019, pp. 28, for U.S. Appl. No. 15/829,715.
Final Office Action dated Aug. 9, 2019, pp. 35, for U.S. Appl. No. 15/829,715.
U.S. Appl. No. 16/508,291, filed Jul. 10, 2019.
Preliminary Amendment dated Jul. 10, 2019, pp. 8, for U.S. Appl. No. 16/508,291, filed Jul. 10, 2019.
List of IBM Patents or Patent Applications Treated as Related, dated Aug. 19, 2019, pp. 2.
Amendment dated Nov. 8, 2019, pp. 11, for U.S. Appl. No. 15/829,715.
Notice of Allowance dated Dec. 18, 2019, pp. 17, for U.S. Appl. No. 15/829,715.
Notice of Allowance dated Feb. 20, 2020, pp. 34, for U.S. Appl. No. 16/508,291.
U.S. Appl. No. 16/735,654, filed Jan. 6, 2020.
Preliminary Amendment dated Jan. 6, 2020, pp. 7.
List of IBM Patents and Applications Treated as Related, pp. 2, Jan. 30, 2020.

* cited by examiner

REDUCING A RATE AT WHICH DATA IS MIRRORED FROM A PRIMARY SERVER TO A SECONDARY SERVER

BACKGROUND OF THE INVENTION

1. Field of the Invention

The present invention relates to a computer program product, system, and method for reducing a rate at which data is mirrored from a primary server to a secondary server.

2. Description of the Related Art

In a storage controller, drives can fail in a Redundant Array of Independent Disks (RAID) array. When a drive fails in a RAID array, the storage controller will swap in a new drive and rebuild the RAID array from parity and/or redundancy data along with data on remaining drives. Rebuilding a RAID array is a processor intensive operation which can saturate the processors on the device adapter managing access to the drives in the RAID array. If the RAID array is experiencing large Input/Output (I/O) request traffic, then the rebuild operation may be delayed as the device adaptor has to divert processor resources to processing the I/O requests. If the rebuilding of the RAID array is delayed, then during this time there is a risk that if a failure of another disk occurs, the data in the RAID drives may not be able to be recovered if the number of failed drives exceeds the RAID fault tolerance.

Thus, there is a need in the art for improved techniques to manage I/O requests at a processor that is also performing an ongoing critical operation, such as rebuilding a RAID array.

SUMMARY

Provided are a computer program product, system, and method for reducing a rate at which data is mirrored from a primary server to a secondary server. A determination is made as to whether a processor utilization at a processor managing access to the secondary storage exceeds a utilization threshold. If so, a determination is made as to whether a specified operation at the processor is in progress. A message is sent to the primary server to cause the primary server to reduce a rate at which data is mirrored from the primary server to the secondary server in response to determining that the specified operation is in progress.

DETAILED DESCRIPTION

In a data mirroring environment where a primary server mirrors modified data to a secondary server to store in a secondary storage, a device adaptor at the secondary server may continually process I/O requests for data being mirrored while trying to complete an important critical operation, such as rebuilding a RAID array to which the data is being mirrored in the secondary storage. Described embodiments provide techniques to throttle the mirroring of data to a device adaptor at the secondary server to allow more device adaptor processor resources to be used to complete rebuilding the RAID array. With the described embodiments, risk of data loss is reduced by allowing the operation in progress, such as rebuilding a RAID array, to complete faster, before other drives fail and the data cannot be recovered. Further, by reducing the data mirroring rate during the RAID rebuild operation, the drives experience less stress, which reduces the risk the drives will fail during the rebuild operation.

Described embodiments improve the computer technology for managing the mirroring of data from the primary server to the secondary server by providing techniques to allow the secondary server to throttle the data mirroring rate at the primary server to the secondary server if the device adaptor at the secondary server receiving the mirrored data is also performing a critical task such that extended delays in completing the task, such as rebuilding a RAID array, increases the risk of data loss.

Figure 1:
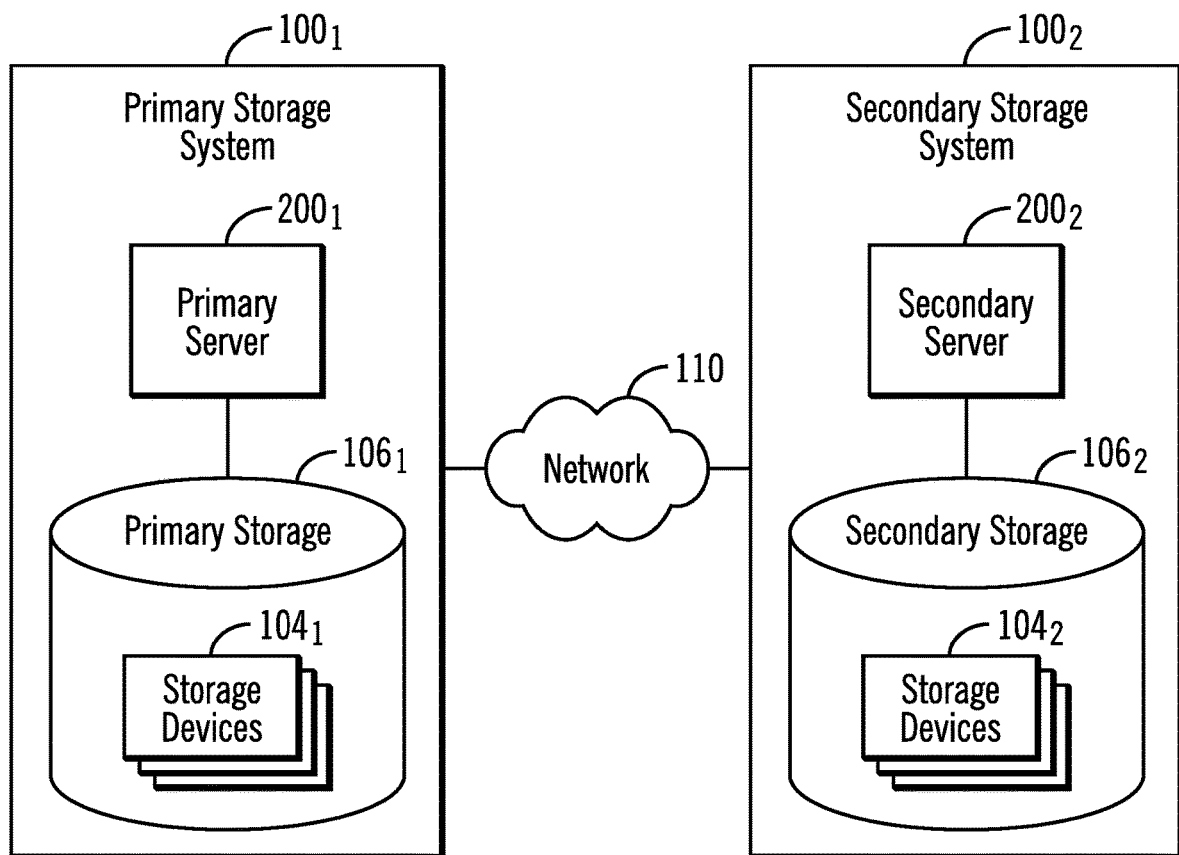
FIG. 1 illustrates an embodiment of a data mirroring storage environment.

FIG. 1 illustrates an embodiment of a data storage environment having at least two storage systems $100_1$ and $100_2$, each including servers (or storage controllers) $200_1$- and $200_2$, respectively, managing access to storage devices $104_1$ and $104_2$ configured in the primary $106_1$ and secondary $106_2$ storages, respectively. Host systems (not shown) may perform read and write operations with respect to the storage devices $104_1$ over a storage network 110 or a separate network. The primary storage $106_1$ may comprise primary production volumes to which hosts direct read and write request. The primary server $200_1$ may mirror data in volumes configured in the storage devices $104_1$ in the primary storage $106_1$ to the secondary storage system $100_2$ to maintain data in consistency groups at the secondary storage $106_2$.

The term "storage system" as used herein may refer to a server $200_1$, $200_2$ and/or the storage $106_1$, $106_2$ managed by the server.

The storages $106_1$, $106_2$ may comprise different types or classes of storage devices $104_1$, $104_2$, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The storage devices $104_1$, $104_2$ may further be configured from as a an array of devices, such as Just a Bunch of Disks (JBOD), Direct Access Storage Device (DASD), Redundant Array of Independent Disks (RAID) array, virtualization device, etc. Further, the storage devices $104_1$, $104_2$ may comprise heterogeneous storage devices from different vendors and different types of storage devices, such as a first type of storage devices, e.g., hard disk drives, that have a slower data transfer rate than a second type of storage devices, e.g., SSDs.

The storage network 110 used by the storage systems $100_1$ and $100_2$ to mirror data may comprise a storage network such as one or more interconnected Local Area Networks (LAN), Storage Area Networks (SAN), Wide Area Network (WAN), peer-to-peer network, wireless network, etc.

Figure 2:
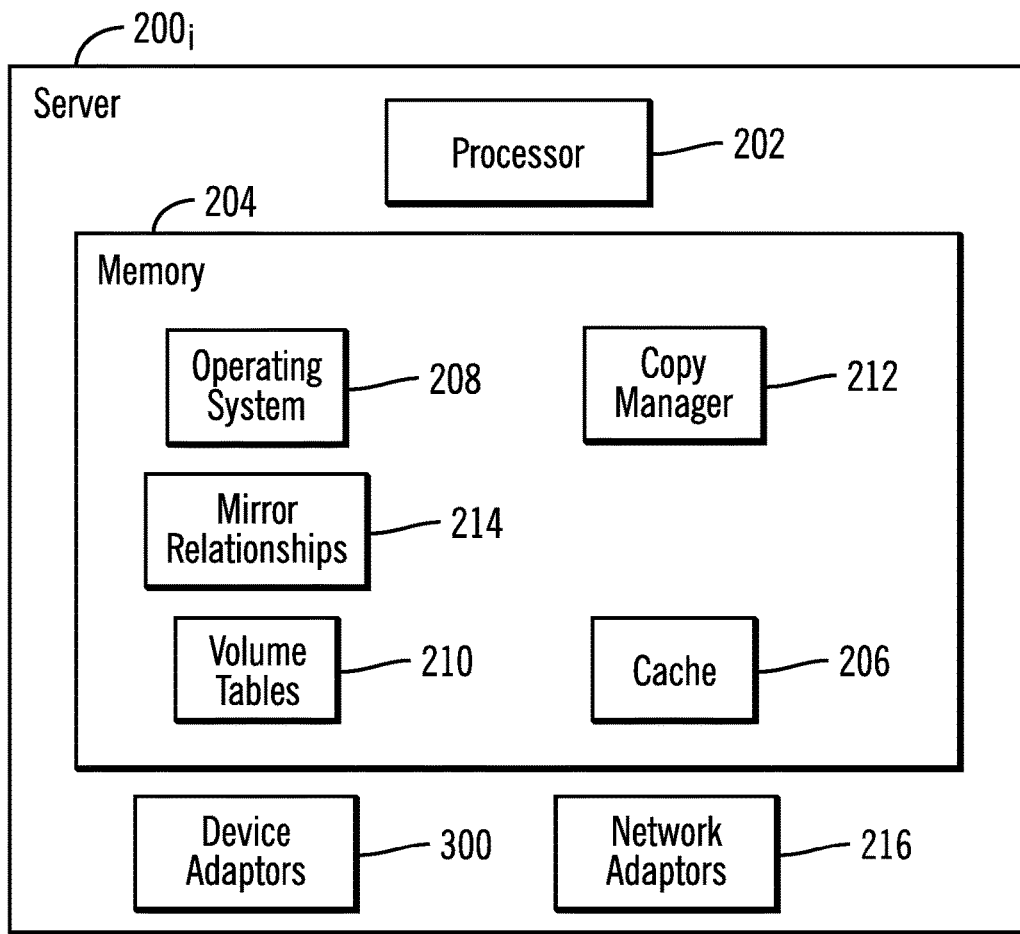
FIG. 2 illustrates an embodiment of a server in the storage environment.

FIG. 2 shows components of a server $200_1$, such as one of the servers $200_1$ and $200_2$, including a processor 202 and a memory 204 including programs executed by the processor 202 as well as a cache 206 to cache read and write data for the storage $106_i$. A portion of the cache 206 may also be used to transfer data in a consistency group that is subject to a space release command.

The memory 204 includes an operating system 208, which configures volumes in the storage devices $104_i$ and maintains volume tables 210, such as a volume table of contents (VTOC), file allocation table, etc., providing information on the volumes configured in the storage devices $104_i$. The operating system 208 further manages I/O requests to the volumes managed by the server $200_i$.

The memory 204 includes a copy manager 212 to create and manage mirror relationships 214 of source data in the first storage system $106_1$ to target data in the second storage system $106_2$ as part of consistency groups. The copy manager 212 in the primary server $200_1$ may manage the mirroring of data at the primary storage $106_1$ to the secondary server $200_2$, and the copy manager 212 at the secondary server $200_2$ may manage the storage of the mirrored data at the secondary storage $106_2$.

The server $200_i$ includes one or more device adaptors 300 to manage access to the storage devices $104_i$ in the storage $106_i$ and one or more network adaptors 216 to communicate with the network 110.

Figure 3:
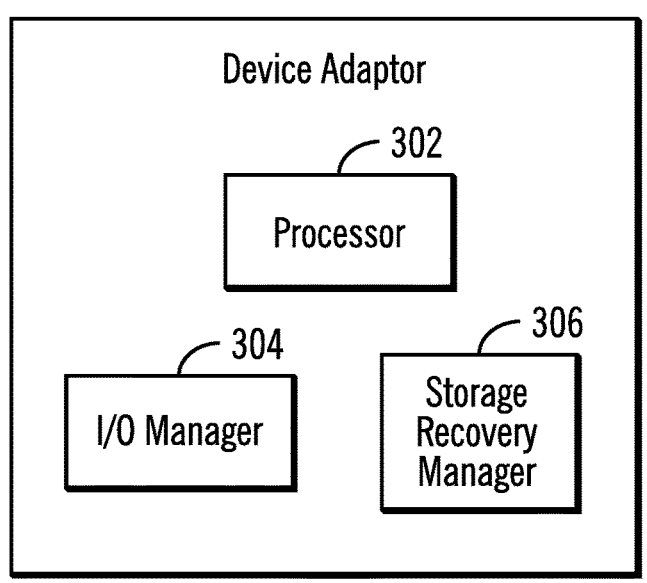
FIG. 3 illustrates an embodiment of a device adaptor.

FIG. 3 illustrates an embodiment of a device adaptor $300_i$, such as one of the device adaptors 300, including a processor 302, such as one or more processor devices, an I/O manager 304 executed by the processor to manage the execution of I/O requests from one of the servers $200_1$, $200_2$, with respect to the storages $106_1$, $106_2$, and a storage recovery manager 306 to recover from a failure at one of the storage devices $104_1$, $104_2$ in the storages $106_1$, $106_2$. In embodiments where one or more RAID arrays, or other logical storage units, are configured in the storages $106_1$, $106_2$, the storage recovery manager 306 may rebuild a RAID array in available storage devices $104_1$, $104_2$ in the storage $106_1$, $106_2$, if one or more of the storage devices fail, using parity and/or redundancy data to reconstruct data on a failed storage device. In RAID embodiments, the I/O manager 304 may include RAID algorithms to stripe data across storage devices $104_1$, $104_2$ and generate parity and/or redundancy data to stripe on the storage devices of the storage $104_1$, $104_2$, where the parity and/or redundancy data is used if one or more storage devices in which the RAID array is configured fails. Various RAID levels use parity or various forms of redundancy data to recreate data in the event of one or more failures. The term "parity" refers to, without limitation, any form of redundancy data such as XOR parity, Reed-Solomon encoded redundancy data, ECC, etc. that is applicable for a given RAID implementation.

Figure 4:
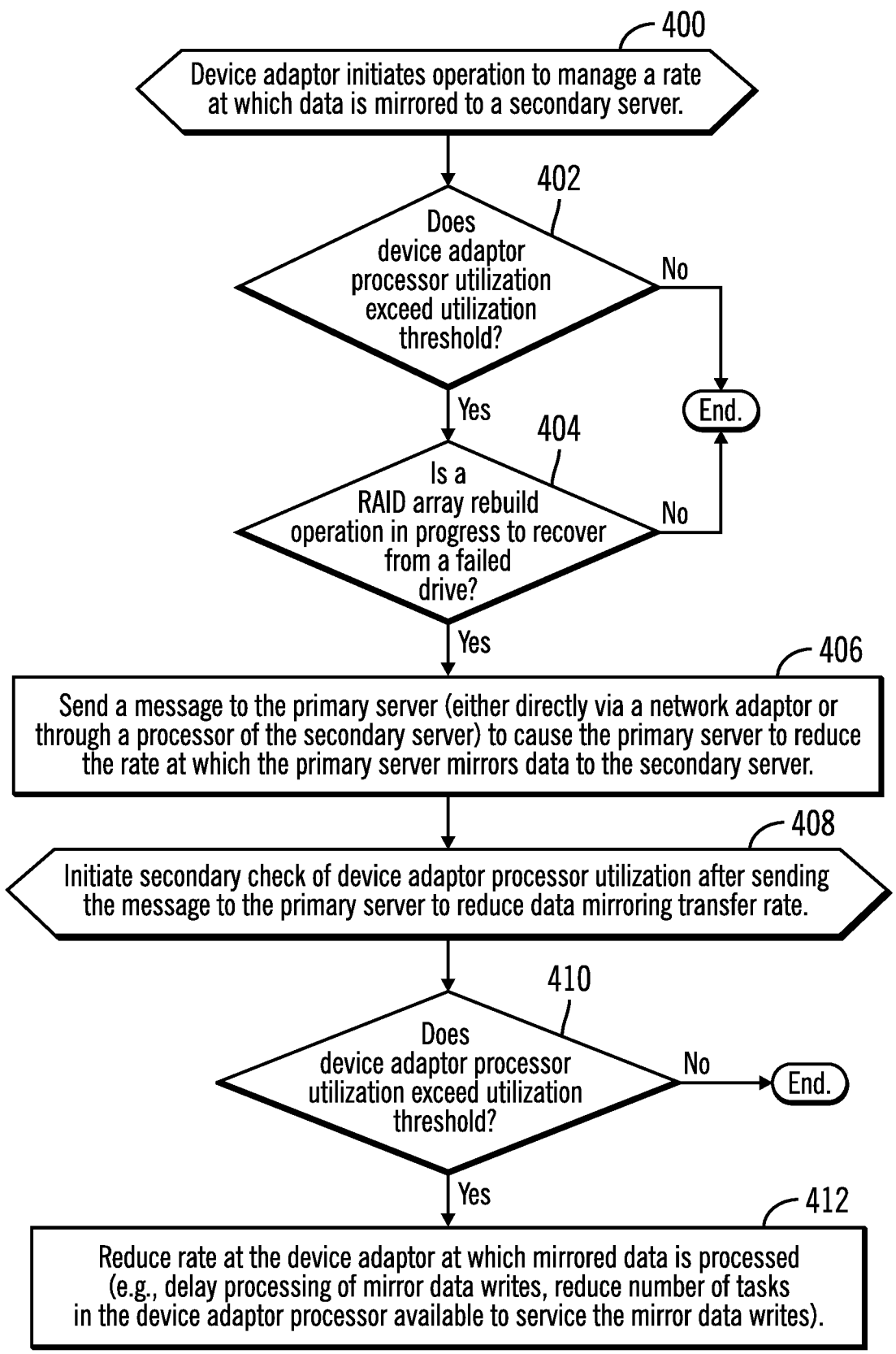
FIG. 4 illustrates an embodiment of operations for a device adaptor to manage a rate at which data is mirrored from the primary server to the secondary server.

FIG. 4 illustrates an embodiment of operations performed in the I/O manager 304 or other component of a device adaptor $300_i$ of the secondary server $200_2$ to manage the rate at which data is mirrored from the primary server $200_1$ to the device adaptor $300_i$ in the secondary server $200_2$ to store in the secondary storage $106_2$. Upon initiating (at block 400) operations to manage the rate of requests, the device adaptor I/O manager 304 determines (at block 402) whether a device adaptor processor 302 utilization exceeds a utilization threshold. If (at block 402) the threshold is exceeded and if (at block 404) a specified operation at the device adaptor $300_i$ is in progress, which may comprise a critical operation, such as rebuilding a RAID array in a failed disk drive, operating in failover mode to handle requests for a failed processor, etc., then the device adaptor I/O manager 304 sends (at block 406) a message to the primary server $200_1$, either directly via the network adaptor 216 in the secondary server $200_2$ or through the I/O manager 304, to cause the primary server $200_1$ processor to reduce the rate at which mirrored data is transferred from the copy manager 212 at the primary server $200_1$ to the secondary server $200_2$. In certain embodiments, the message may cause the primary server $200_1$ to reduce the rate of transferring requests by at least one of add a delay to service requests at the second processor and reduce a number of tasks in the second processor assigned to service the requests.

After an interval following the sending of the message to cause the primary server $200_1$ to reduce the rate at which requests are transferred, the device adaptor I/O manager 304 may initiate (at block 408) a secondary check of the device adaptor processor 302 utilization. As part of the secondary check, if (at block 410) the processor utilization of the device adaptor processor 302 still exceeds the utilization threshold, then the primary server $200_1$ reducing the rate of sending requests has not sufficiently succeeded in reducing the burdens on the device adaptor processor 302 utilization. In such case, the device adaptor I/O manager 304 may reduce (at block 412) the rate at which the device adaptor processor 302 processes the mirrored data to write to the secondary storage $106_2$ or performs other operations to reduce the burdens on the device adaptor processor 302.

With the described embodiments of FIG. 4, a device adaptor $300_i$ processing mirrored data to write to the secondary storage $106_2$ from a primary server $200_1$ and whose processor utilization is relatively high, may send a message to the primary server $200_1$ to reduce the rate at which mirrored data is transmitted to the secondary server $200_2$ to reduce processing burdens on the device adaptor processor 302 while the device adaptor processor 302 is performing a specified or critical operation, such as rebuilding a RAID array, handling excessive traffic as a result of a failover, etc. Reducing the burden of processing requests frees processor resources to allow the first processor to complete or continue with the specified operation without experiencing delays from high processor utilization resulting from I/O requests.

In an alternative embodiment, components other than the device adaptors $300_i$ may take action to reduce the rate at which the primary server $200_1$ transfers mirrored data, such as the secondary server $200_2$ operating system 208, a primary or secondary server network adaptor 216, etc.

Figure 5:
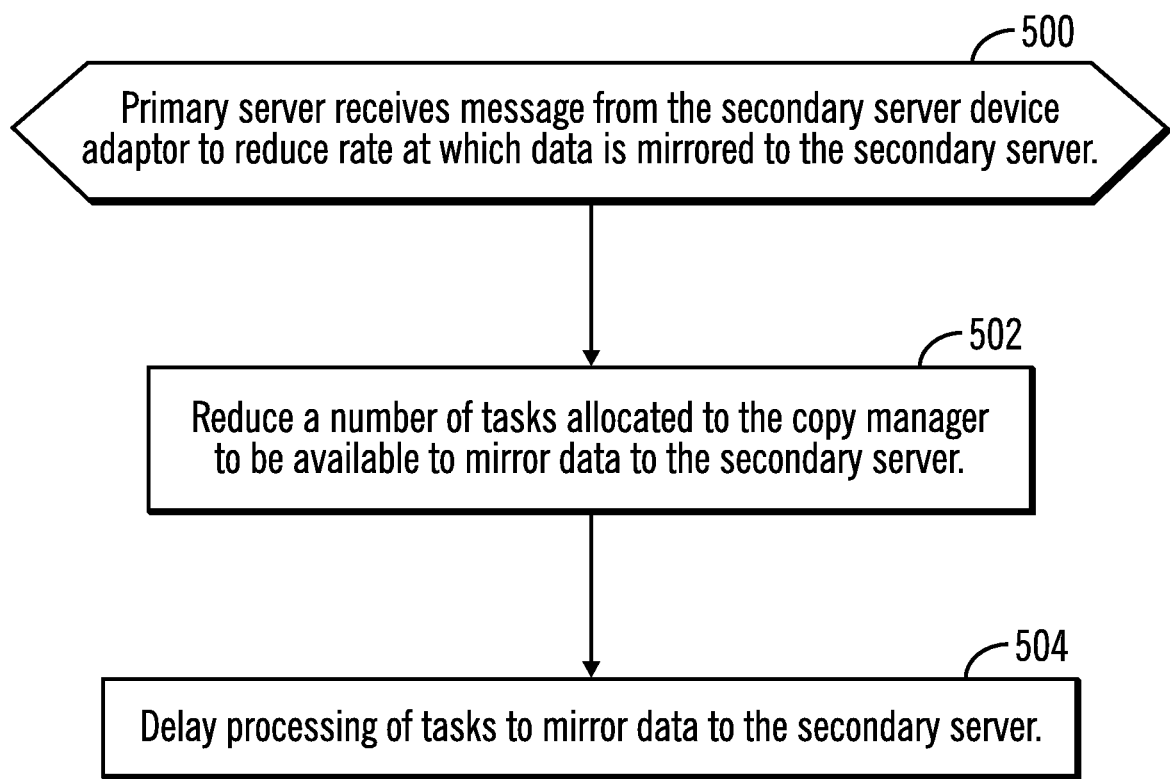
FIG. 5 illustrates an embodiment of operations performed by the primary server to reduce the rate of mirroring data to the secondary server.

FIG. 5 illustrates an embodiment of operations performed by the primary server $200_1$ operating system 208 in response to receiving a message from the secondary server $200_2$ device adaptor $300_i$ to reduce the rate of transferring mirrored data to the secondary server $200_2$ and its device adaptor $300_i$. Upon receiving (at block 500) the message, the primary server $200_1$ operating system 208 may perform one or more of the operations at blocks 502 and 504. At block 502, the primary server $200_1$ operating system 208 may reduce a number of tasks allocated to the copy manager 212 to be available to mirror data to the secondary server $200_2$. At block 504, the operating system 208 at the primary server $200_1$ may delay processing of copy manager 212 tasks to mirror data to the secondary server $200_2$.

With the embodiment of FIG. 5, the primary server $200_1$ operating system 208 may take different actions to reduce the rate at which I/O requests are sent to the device adaptor $300_i$ to reduce processor 302 utilization at the device adaptor $300_i$ from I/O requests so that more device adaptor processor 302 resources are available for the critical operation in progress, such as rebuilding a RAID array, handling a failover from another device adaptor, etc.

Figure 6:
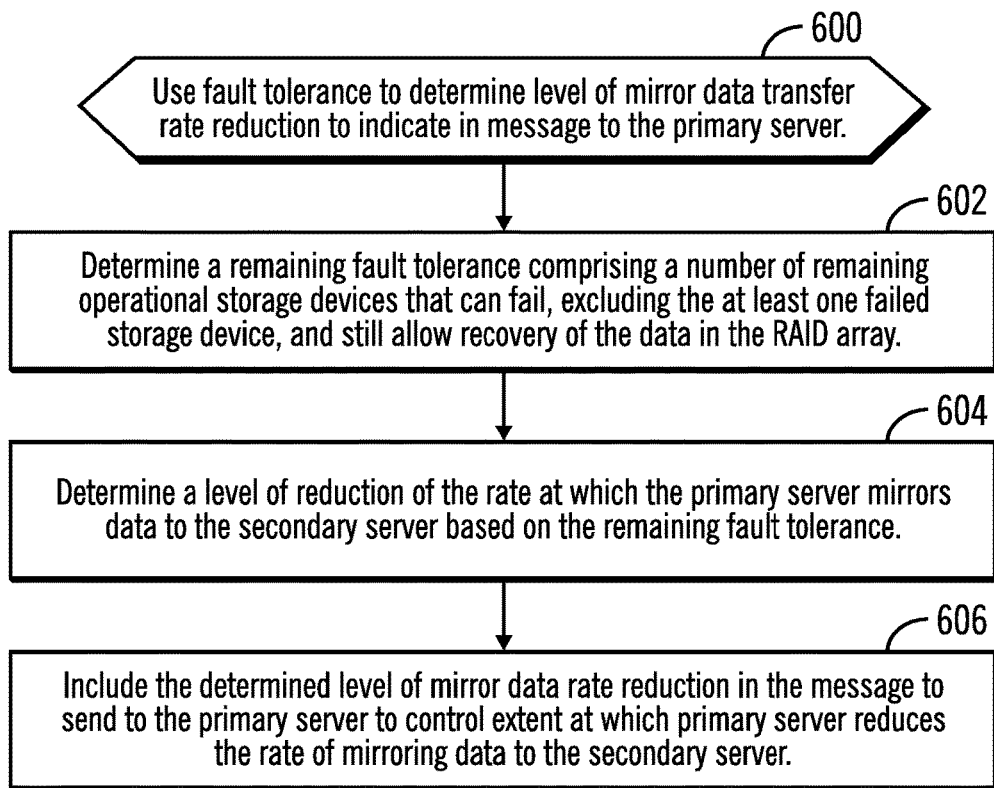
FIG. 6 illustrates an embodiment of operations for a device adaptor to consider fault tolerance of a RAID array in determining a level of data mirroring reduction to indicate in a message to the primary server.

FIG. 6 illustrates an embodiment of operations performed by the secondary server $200_2$ device adaptor I/O manager 304 to determine a level of I/O request rate reduction to indicate in the message to the primary server $200_1$ based on fault tolerance of the RAID array while the RAID array is being rebuilt. For instance, RAID 6 provides double parity, or a fault tolerance of two storage drives, which means up to two drives in a RAID 6 array can fail and still allow recovery of the data from the parity data and customer data on the remaining drives. Other RAID levels provide a fault tolerance of one drive, which means data can only be recovered if only one drive in the RAID array fails. Upon initiating (at block 600) the operation to consider remaining fault tolerance for the RAID array being rebuilt, the device adaptor I/O manager 304 determines (at block 602) a remaining fault tolerance comprising a number of remaining operational storage devices $104_2$ in the secondary storage $106_2$, excluding the at least one failed storage device, that can fail and still allow recovery of the data in the RAID array. For instance, after the failure of one storage device resulting in an ongoing RAID recovery operation, the remaining fault tolerance for RAID 6 may be one storage drive, i.e., non-zero fault tolerance, because the initial fault tolerance was two drives, and for single parity RAID, such as RAID, 5, after the failure of one storage device, the remaining fault tolerance would be zero drives, or zero fault tolerance.

The device adaptor I/O manager 304 determines (at block 604) a level of reduction of the rate at which the primary server $200_1$ mirrors data to the secondary server $200_2$ based on the remaining fault tolerance, where there may be different levels of reduction for different remaining fault tolerances, such as 0, 1 or 2 number of remaining operational storage drives after the recent failure. Thus, the secondary server device adaptor I/O manager 304 maintains different levels of I/O request rate reductions for different remaining fault tolerances. For a lower level rate reduction, the primary server $200_1$ operating system 208 may perform less aggressive rate reduction operations than for a higher level rate reduction. The device adaptor I/O manager 304 includes (at block 606) the determined level of mirror data rate reduction in the message to send to the primary server $200_1$ to control the extent to which primary server $200_1$ reduces the rate of mirroring data to the secondary server $200_2$.

With the operations of FIG. 6, the secondary server $200_2$ device adaptor $300_i$ determines a level of data mirroring rate reduction based on the remaining fault tolerance. If the remaining fault tolerance is low, such as zero drives that can fail, i.e., zero fault tolerance, then the device adaptor $300_i$ may instruct the primary server $200_1$ to engage in the highest level of data mirroring rate reduction to maximize the reduction in the load on the device adaptor processor 302 to allow the rebuilding of the RAID array in the secondary storage $106_2$ to complete as fast as possible. However, if the fault tolerance is higher, such as one or more, i.e., non-zero fault tolerance, then the data mirroring rate reduction may be less than for zero fault tolerance because a single disk failure will not result in loss of data, so the device adaptor may handle more mirrored data and take longer to complete the rebuilding of the RAID array.

Figure 7:
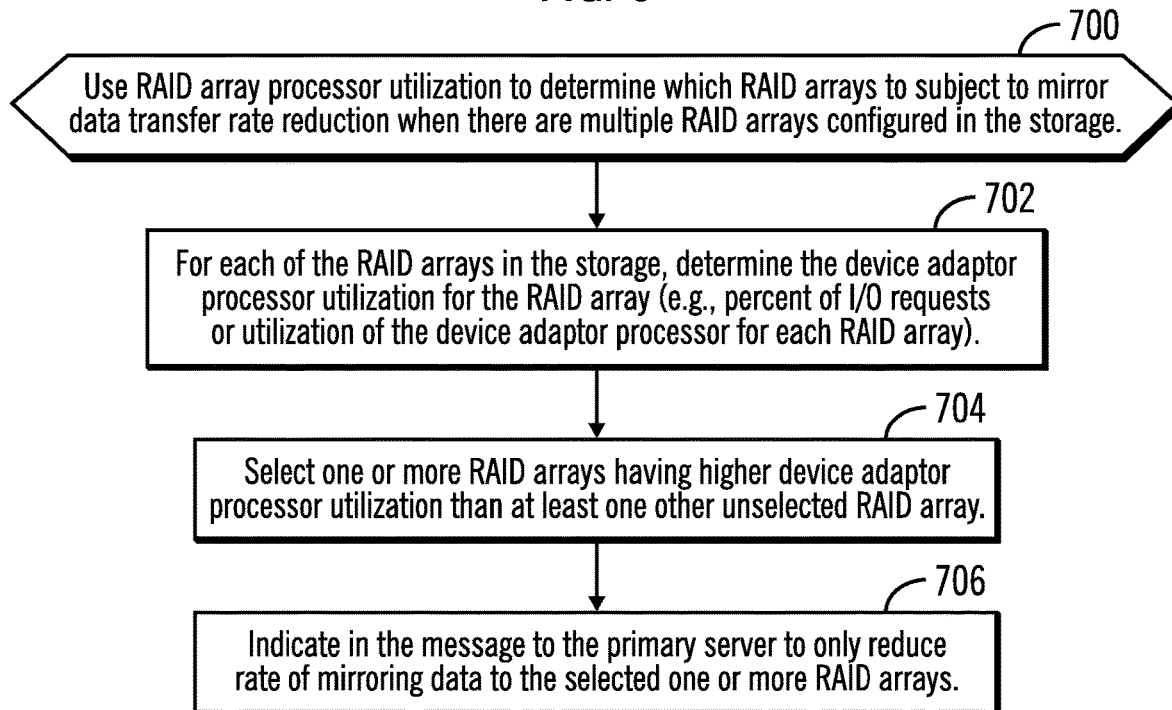
FIG. 7 illustrates an embodiment of operations for a device adaptor to determine RAID arrays to subject to data mirroring rate reduction.

FIG. 7 illustrates an embodiment of operations performed by the secondary server $200_2$ device adaptor I/O manager 304 to determine content for the message to send to the primary server $200_1$ to reduce data mirrored when there are multiple RAID arrays, or other types of logical storage units, configured in the secondary storage $106_2$. Upon initiating (at block 700) an operation to determine the content for the message to the primary server $200_1$ when there are multiple RAID arrays, the secondary server device adaptor I/O manager 304 determines (at block 702), for each of the RAID arrays in the secondary storage $106_2$, the device adaptor processor 302 utilization for the RAID array (e.g., percent of I/O requests or utilization of the processor for each RAID array). The I/O manager 304 selects (at block 704) one or more RAID arrays having higher device adaptor processor 302 utilization than at least one other unselected RAID array, such as a predetermined number of RAID arrays having the highest processor 302 utilization. The I/O manager 304 may then indicate (at block 706) in the message to the primary server $200_1$ to only reduce the rate of mirroring data to the selected one or more RAID arrays in the secondary storage $106_2$, and not reduce the rate of I/O requests for those RAID arrays not selected for rate reduction.

With the described embodiments of FIG. 7, I/O request rate reduction is targeted toward those RAID arrays that are having the greatest impact on the device adaptor processor utilization, so that only data mirroring to those RAID arrays having the more significant impact on device adaptor utilization are delayed. I/O requests to RAID arrays having less of an impact on device adaptor utilization may not have their data mirroring transmission rate reduced, because requests to those RAID arrays are not having as much impact on processor utilization.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing mirroring data from a primary server to a secondary server having a secondary storage, the computer program product comprising a computer readable storage medium having computer readable program code embodied therein that is executed by a processor to perform operations, the operations comprising:
    determining whether a processor utilization at a processor managing access to the secondary storage exceeds a utilization threshold, wherein the processor is implemented in a device adaptor for the secondary server;
    determining a processor utilization for each logical storage unit of a plurality of logical storage units in the secondary storage in response to determining that the processor utilization at the device adaptor exceeds the utilization threshold;
    selecting at least one logical storage unit causing higher processor utilization than at least one other logical storage unit;
    determining whether the processor is rebuilding a storage array at the secondary storage to recover from a failed storage device at the secondary storage; and
    sending a message to the primary server to cause the primary server to reduce a rate at which is mirrored data is transmitted from the primary server to the selected at least one logical storage unit in response to determining that the storage array is being rebuilt at the secondary storage and that the processor utilization at the processor exceeds the utilization threshold.

2. The computer program product of claim 1, wherein the processor utilization comprises a first processor utilization, wherein the operations further comprise:
    determining whether a second processor utilization at the processor exceeds the utilization threshold after sending the message; and
    reducing, by the processor, a rate at which mirrored data from the primary server is processed in response to determining that the second processor utilization exceeds the utilization threshold.

3. The computer program product of claim 1, wherein the sending the message to the primary server is to cause the primary server to reduce the rate at which mirrored data is transmitted to the secondary server by at least one of adding a delay to mirroring data to the secondary server and reducing resources at the primary server allocated to mirror data to the secondary server.

4. The computer program product of claim 1, wherein the message is further sent to the primary server to cause the primary server to reduce the rate at which mirrored data is transmitted in response to determining that a failover to the device adaptor from another device adaptor at the secondary server and that the processor utilization at the processor exceeds the utilization threshold.

5. The computer program product of claim 1, wherein the secondary storage comprises storage devices configured as a Redundant Array of Independent Disks (RAID) array, and wherein the rebuilding the storage array comprises rebuilding the RAID array using a replacement storage device for a failed storage device of the storage devices.

6. The computer program product of claim 1, wherein the operations further comprise:
    determining a remaining fault tolerance comprising a number of remaining operational storage devices that can fail, excluding the failed storage device, and still allow recovery of data in the storage array; and
    determining a level of reduction of the rate at which mirrored data is transferred to the secondary server from multiple levels of reduction based on the remaining fault tolerance, wherein the message sent to the primary server indicates a level of reduction, of the multiple levels of reduction, to cause the secondary server to reduce the rate at which mirrored data is transferred according to the level of reduction.

7. The computer program product of claim 1, wherein the processor utilization comprises a first processor utilization, wherein the operations further comprise:
    determining, by the device adaptor, whether a second processor utilization at the device adaptor exceeds the utilization threshold after sending the message; and
    in response to determining that the second processor utilization exceeds the utilization threshold, performing at least one of:
        delaying processing the mirrored data to transmit to the secondary storage; and
        reducing a number of tasks that are available to service the mirrored data to transmit to the secondary storage.

8. The computer program product of claim 1, wherein the secondary server includes a network adaptor, wherein the device adaptor communicates the message to the network adaptor over a bus to transmit to the primary server.

9. A system for managing mirroring data from a primary server to a secondary server having a secondary storage, comprising:
    a processor; and
    a computer readable storage medium having computer readable program code embodied therein that is executed by the processor to perform operations, the operations
        determining whether a processor utilization at the processor managing access to the secondary storage exceeds a utilization threshold, wherein the processor is implemented in a device adaptor for the secondary server;
        determining a processor utilization for each logical storage unit of a plurality of logical storage units in the secondary storage in response to determining that the processor utilization at the device adaptor exceeds the utilization threshold;
        selecting at least one logical storage unit causing higher processor utilization than at least one other logical storage unit;
        determining whether the processor is rebuilding a storage array at the secondary storage to recover from a failed storage device at the secondary storage; and
        sending a message to the primary server to cause the primary server to reduce a rate at which is mirrored data is transmitted from the primary server to the selected at least one logical storage unit in response to determining that the storage array is being rebuilt at the secondary storage and that the processor utilization at the processor exceeds the utilization threshold.

10. The system of claim 9, wherein the processor utilization comprises a first processor utilization, wherein the operations further comprise:
   determining whether a second processor utilization at the processor exceeds the utilization threshold after sending the message; and
   reducing, by the processor, a rate at which mirrored data from the primary server is processed in response to determining that the second processor utilization exceeds the utilization threshold.

11. The system of claim 9, wherein the sending the message to the primary server is to cause the primary server to reduce the rate at which mirrored data is transmitted to the secondary server by at least one of adding a delay to mirroring data to the secondary server and reducing resources at the primary server allocated to mirror data to the secondary server.

12. The system of claim 9, wherein the operations further comprise:
   determining a remaining fault tolerance comprising a number of remaining operational storage devices that can fail, excluding the failed storage device, and still allow recovery of data in the storage array; and
   determining a level of reduction of the rate at which mirrored data is transferred to the secondary server from multiple levels of reduction based on the remaining fault tolerance, wherein the message sent to the primary server indicates a level of reduction, of the multiple levels of reduction, to cause the secondary server to reduce the rate at which mirrored data is transferred according to the level of reduction.

13. The system of claim 9, wherein the processor utilization comprises a first processor utilization, wherein the operations further comprise:
   determining, by the device adaptor, whether a second processor utilization at the device adaptor exceeds the utilization threshold after sending the message; and
   in response to determining that the second processor utilization exceeds the utilization threshold, performing at least one of:
      delaying processing the mirrored data to transmit to the secondary storage; and
      reducing a number of tasks that are available to service the mirrored data to transmit to the secondary storage.

14. A method for managing mirroring data from a primary server to a secondary server having a secondary storage, comprising:
   determining whether a processor utilization at a processor managing access to the secondary storage exceeds a utilization threshold, wherein the processor is implemented in a device adaptor for the secondary server;
   determining a processor utilization for each logical storage unit of a plurality of logical storage units in the secondary storage in response to determining that the processor utilization at the device adaptor exceeds the utilization threshold;
   selecting at least one logical storage unit causing higher processor utilization than at least one other logical storage unit;
   determining whether the processor is rebuilding a storage array at the secondary storage to recover from a failed storage device at the secondary storage; and
   sending a message to the primary server to cause the primary server to reduce a rate at which mirrored data is transmitted from the primary server to the selected at least one logical storage unit in response to determining that the storage array is being rebuilt at the secondary storage and that the processor utilization at the processor exceeds the utilization threshold.

15. The method of claim 14, wherein the processor utilization comprises a first processor utilization, further comprising:
   determining whether a second processor utilization at the processor exceeds the utilization threshold after sending the message; and
   reducing, by the processor, a rate at mirrored data from the primary server is processed in response to determining that the second processor utilization exceeds the utilization threshold.

16. The method of claim 14, wherein the sending the message to the primary server is to cause the primary server to reduce the rate at which mirrored data is transmitted to the secondary server by at least one of adding a delay to mirroring data to the secondary server and reducing resources at the primary server allocated to mirror data to the secondary server.

17. The method of claim 14, further comprising:
   determining a remaining fault tolerance comprising a number of remaining operational storage devices that can fail, excluding the failed storage device, and still allow recovery of data in the storage array; and
   determining a level of reduction of the rate at which mirrored data is transferred to the secondary server from multiple levels of reduction based on the remaining fault tolerance, wherein the message sent to the primary server indicates a level of reduction, of the multiple levels of reduction, to cause the secondary server to reduce the rate at which mirrored data is transferred according to the level of reduction.

18. The method of claim 14, wherein the processor utilization comprises a first processor utilization, further comprising:
   determining, by the device adaptor, whether a second processor utilization at the device adaptor exceeds the utilization threshold after sending the message; and
   in response to determining that the second processor utilization exceeds the utilization threshold, performing at least one of:
      delaying processing the mirrored data to transmit to the secondary storage; and
      reducing a number of tasks that are available to service the mirrored data to transmit to the secondary storage.

* * * * *